United States Patent [19]

Duffy

[11] Patent Number: 4,877,099

[45] Date of Patent: * Oct. 31, 1989

[54] ELECTRONICALLY CONTROLLED VARIABLE ASSIST POWER STEERING SYSTEM

[75] Inventor: James J. Duffy, Livonia, Mich.

[73] Assignee: Ford Motor Company, Dearborn, Mich.

[*] Notice: The portion of the term of this patent subsequent to Aug. 2, 2005 has been disclaimed.

[21] Appl. No.: 209,162

[22] Filed: Jun. 17, 1988

Related U.S. Application Data

[63] Continuation-in-part of Ser. No. 902,919, Sep. 2, 1986, Pat. No. 4,760,892.

[51] Int. Cl.⁴ .............................................. B62D 5/08
[52] U.S. Cl. .................... 180/142; 180/148; 137/625.65; 251/30.05
[58] Field of Search .............. 180/141, 142, 143, 147, 180/148, 132; 137/625.65; 251/30.02, 30.05

[56] References Cited

U.S. PATENT DOCUMENTS

| | | | |
|---|---|---|---|
| 4,063,490 | 12/1977 | Duffy | 91/467 |
| 4,418,779 | 12/1983 | Nakayama | 180/141 |
| 4,463,936 | 8/1984 | Shinbori | 180/141 |
| 4,473,128 | 9/1984 | Nakayama | 180/142 |
| 4,485,883 | 12/1984 | Duffy | 180/142 |
| 4,513,835 | 4/1985 | Fukino | 180/142 |
| 4,516,471 | 5/1985 | Duffy | 91/375 A |
| 4,561,521 | 12/1985 | Duffy | 180/142 |
| 4,570,736 | 2/1986 | Waldorf | 180/143 |
| 4,585,206 | 4/1986 | Itoh | 251/30.02 |
| 4,586,582 | 5/1986 | Duffy | 180/142 |
| 4,669,568 | 6/1987 | Kervagoret | 180/142 |
| 4,672,885 | 6/1987 | Kervagoret | 180/143 |
| 4,673,162 | 6/1987 | Lachmann | 251/30.05 |
| 4,760,892 | 8/1988 | Duffy | 180/148 |

Primary Examiner—Charles A. Marmor
Assistant Examiner—Tamara L. Finlay
Attorney, Agent, or Firm—Donald J. Harrington; Keith L. Zerschling

[57] ABSTRACT

A power steering gear for a vehicle capable of providing a variable degree of power assistance to supplement manual steering effort wherein the variable assist is achieved by controlling directly the magnitude of the steering pressure made available to a pressure operated motor by a vehicle engine driven pump, the magnitude of the pressure being controlled by a central processing unit that responds to vehicle steering wheel torque and vehicle speed to produce an appropriate steering pressure and power assist for all driving conditions.

5 Claims, 6 Drawing Sheets

FIG. 8.
Prior Art

ELECTRONICALLY CONTROLLED VARIABLE ASSIST POWER STEERING SYSTEM

REFERENCE TO RELATED APPLICATION

This is a continuation-in-part of U.S. patent application Ser. No. 902,919, filed Sept. 2, 1986 now U.S. Pat. No. 4,760,882. That application is assigned to the assignee of the present application.

BACKGROUND OF THE INVENTION

My invention comprises a variable assist power steering gear system for use in automotive vehicles wherein the desired steering pressure for any given steering torque and vehicle speed is controlled instantaneously by an onboard microprocessor unit. My invention is adapted particularly to be used in a rack and pinion steering gear system of the kind disclosed in my Pat. Nos. 4,516,471; 4,485,883; 4,063,490 and 4,561,521.

In each of these prior art power steering gear mechanisms a gear rack is adjustable in the direction of its axis. The rack is connected to the steering gear linkage of a wheeled vehicle and is engaged by a drive pinion connected to a driver controlled steering shaft by a torsion bar. When the vehicle operator applies a steering torque to the steering shaft, the torsion bar deflects as driving torque is distributed to the pinion.

The pinion is connected to a valve sleeve of a rotary steering valve assembly, and the steering shaft is connected to an inner valve element within the valve sleeve. Upon deflection of the torsion bar the inner valve element of the rotary valve assembly is adjusted with respect to the rotary valve sleeve. This valve adjustment controls pressure distribution to each of two fluid pressure working chambers of a fluid motor that applies a fluid pressure force to the rack to effect a power assist.

The fluid pressure pump in a steering system of this type is a positive displacement pump that has a flow control valve to provide a constant flow rate. Steering pressure is varied by controlling the effective fluid flow area through the steering valve, and that area in turn is determined by the degree of deflection of the torsion bar.

In the arrangement shown by Pat. No. 4,561,521, I have provided a dual flow delivery path to the steering valve, one path being defined in part by a speed sensitive bypass valve. The effective flow area through the bypass valve is proportional to vehicle speed so that a reduced flow occurs when the vehicle is operated at high speeds and relatively high flow occurs when the vehicle is operated at low speeds or when the vehicle operator is engaged in parking maneuvers. The bypass valve is controlled by an electric actuator which in turn is controlled by a vehicle speed sensitive electronic module.

GENERAL DESCRIPTION OF THE INVENTION

My present invention is distinguished from the invention of Pat. No. 4,561,521 because the variable assist feature is achieved by regulating directly the steering pressure rather than by controlling the flow area of the valve which would in turn affect the steering pressure.

The variable assist power steering gear mechanism of my present invention uses a simplified rotary valve that may employ valve elements common to valve elements of the kind described in my earlier patents, above identified, without a major change in the shape of the valve housing and without significant capital investments for tooling and facilities for its manufacture for automotive vehicles.

My system includes an electronically actuated area control valve located between the supply and return lines of the positive displacement pump. This controls the rate at which fluid is bypassed from the high pressure side of the pump to the low pressure side. The corresponding valves of FIGS. 4, 5 and 5A of the aforementioned Pat. No. 4,760,892 respond to the pressure differential forces acting on the valves to control the steering pressure. It includes also input torque and vehicle speed sensors which cooperate with a microprocessor unit, the latter controlling the steering assist made available by the steering gear by sending a controlled current to the area control valve in accordance with a preset program in the processing unit. The electronic area control valve acts as an auxiliary steering gear valve in parallel hydraulically with the rotary steering valve assembly as in the case of Pat. No. 4,561,521. Whenever the electronic area control valve is functioning and bypassing fluid through the parallel flow circuit, the steering pressure is lower than the pressure that would exist if the electronic area control valve were closed.

The microprocessor unit can be programmed with a complete vehicle steering control parameter map which makes it possible to anticipate all possible driving conditions so that an optimum steering pressure for any driving condition is made available. Thus for each steering wheel torque and for each corresponding road speed there is an optimum steering assist made available to the rack and pinion gear mechanism.

PARTICULAR DESCRIPTION OF THE INVENTION

Figures 1, 2:
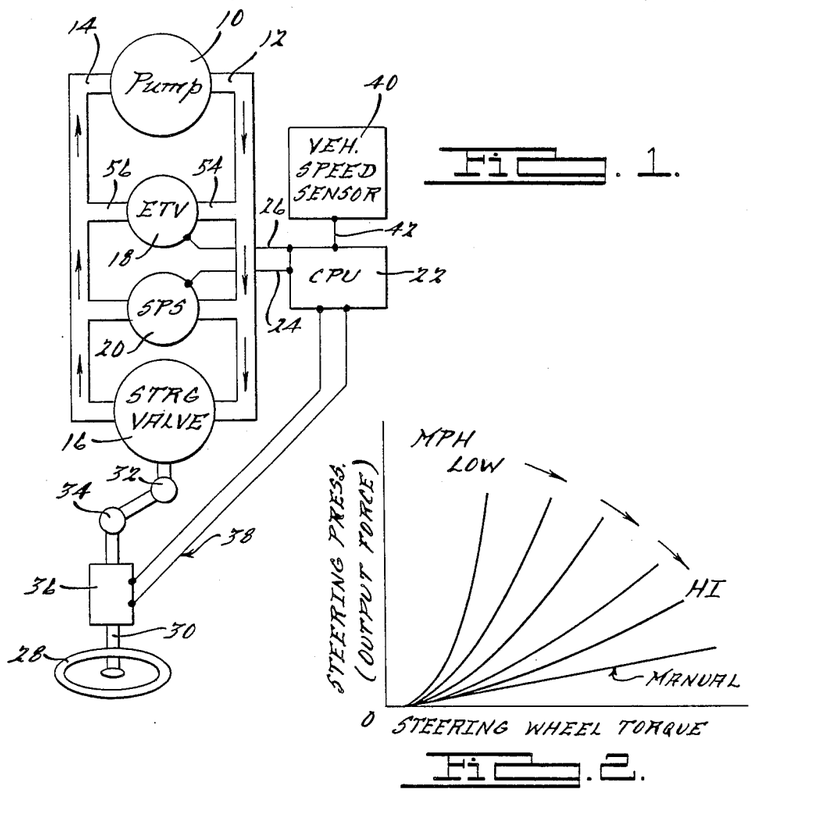
FIG. 1 is a schematic representation of a fluid circuit for a rack and pinion steering gear assembly embodying my invention.
FIG. 2 is a performance chart for my improved steering gear system showing the relationship between steering wheel torque and steering assist for a series of road speeds.

In FIG. 1, numeral 10 designates a power steering pump driven by the vehicle engine. It provides a constant flow in outlet passage 12, and it is supplied with fluid through a supply passage 14. A steering valve assembly 16 has an inlet connected to the passage 12. The return flow line for the steering valve assembly is the supply passage 14 for the pump 10.

Located in parallel relationship with respect to the pump 10 is an electronically controlled throttling valve 18. It is effective to bypass fluid from passage 12 to passage 14 before the fluid reaches steering valve assembly 16. Situated in parallel with the pump 10 and the electric throttling valve 18 is a steering pressure sensor 20 which is used if enhanced steering assist control is desired. Sensor 20 is in communication with a microprocessor or central processor unit (CPU) identified by reference numeral 22, electric connections being shown at 24 and 26 whereby the central processor unit 22 is part of a closed loop system. The sensor detects when a pressure dictated by the speed sensor 40 is established by the throttling valve 18 as the latter responds to the output of the central processing unit.

The vehicle operator, during steering maneuvers, applies a steering torque to steering wheel 28, which is connected to steering shaft 30. Shaft 30 in turn is connected to the driving pinion of a power steering rack and pinion gear through a torsion bar in the usual fashion. The torque flow path from the shaft 30 to the steering valve assembly includes a linkage mechanism that may include U-joints 32 and 34 and a steering wheel torque and angle sensor 36. The sensor 36 develops a signal which is distributed to CPU 22 through electric wiring 38. Vehicle speed sensor 40 develops an electric signal that is distributed to the CPU 22 through wiring 42.

The electronic throttling valve may be a pulse width modulator controlled variable orifice which is governed by CPU 22. Steering pressure is determined by the equation:

$$P = \frac{K \cdot Q^2}{CA}$$

where P is the steering gear piston differential pressure, Q is the rate of flow developed by the pump and A is the sum of the effective throttling areas of steering valve assembly 16 and electronic throttling valve 18.

The steering pressure sensor 20 senses the steering valve inlet pressure minus the outlet pressure, which is approximately the same as the piston differential pressure of the fluid motor for the steering gear system. The electronic throttling valve is designed so that it is able to change pressure to any desired value by changing throttling area of the steering valve assembly.

A so-called map of the desired relationship of the steering pressure with respect to the other sensed inputs for the CPU 22 is programmed into the CPU 22. Thus, for example, steering efforts may be increased as vehicle speed increases by reducing pressure. If it is desired to provide a manual steering effect, that can correspond to a zero steering pressure signal at the desired speed. At higher speeds the pump may be disconnected from the engine for maximum fuel economy.

By locating the electronic torque sensor between the steering wheel and the U-joints 34 and 32, the U-joint friction becomes output friction instead of input friction; that is, it does not cause the steering pressure control system to sense the friction as an input torque. Thus incremental pressure due to the internal friction of the U-joints does not resist the so-called returnability of the steering gear to a straight ahead driving condition following a steering maneuver.

Figures 3, 3A:
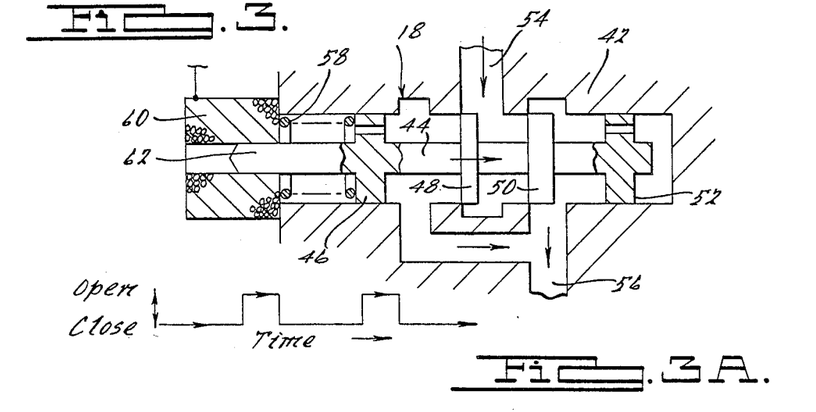
FIG. 3 is a sub-assembly view of an electronic throttling valve for use in the circuit of FIG. 1.
FIG. 3A is a graph showing the shape of the voltage input wave for the solenoid of the valve of FIG. 3.

A first embodiment of the steering assist valve of my invention is shown in detail in FIG. 3. It includes a valve sleeve 42 having internal valve lands and a valve spool 44 with external valve lands. Valve spool 44 has external lands 46, 48, 50 and 52 which register with corresponding internal lands of the sleeve 42. Fluid from the passage 12 is distributed to the electronic throttling valve 18 through passage 54, and fluid is returned from valve 18 to the passage 14 through valve passage 56.

Spool 44 is biased in a right hand direction as seen in FIG. 3 by valve spring 58. A solenoid 60 surrounds solenoid armature 62 which is connected to valve spool 44. When the windings of the solenoid 60 are energized, valve spool 44 moves to the left thereby restricting the degree of communication between passage 54 and 56. When the current in the solenoid windings is decreased, spring 58 moves valve to the right thereby opening communication between passage 54 and 56. A greater volume of fluid is bypassed through the electronic throttling valve 18 as the valve spool 44 moves to the right and the steering pressure decreses. Thus the magnitude of the manual steering effort increases.

The shape of the signal made available to the solenoid is illustrated schematically in FIG. 3A. This is a pulse width modulated electric voltage signal. To increase the effective force acting in a left hand direction to oppose spring 58, the time of each pulse is increased so that the effective force acting in left hand direction on valve spool 44 is increased.

In FIG. 2 I have illustrated the relationship between steering wheel torque and steering pressure or output force for any given vehicle speed. The relationship is generally parabolic. As speed inreses, the magnitude of the slopes of the parabolas decrease. The information illustrated schematically in FIG. 2 can be programmed into the CPU 22 so that it will respond with an appropriate signal for the electronic throttling valve as torque signals and speed signals are distributed to it from sensor 36 and sensor 40, respectively.

Figure 4:
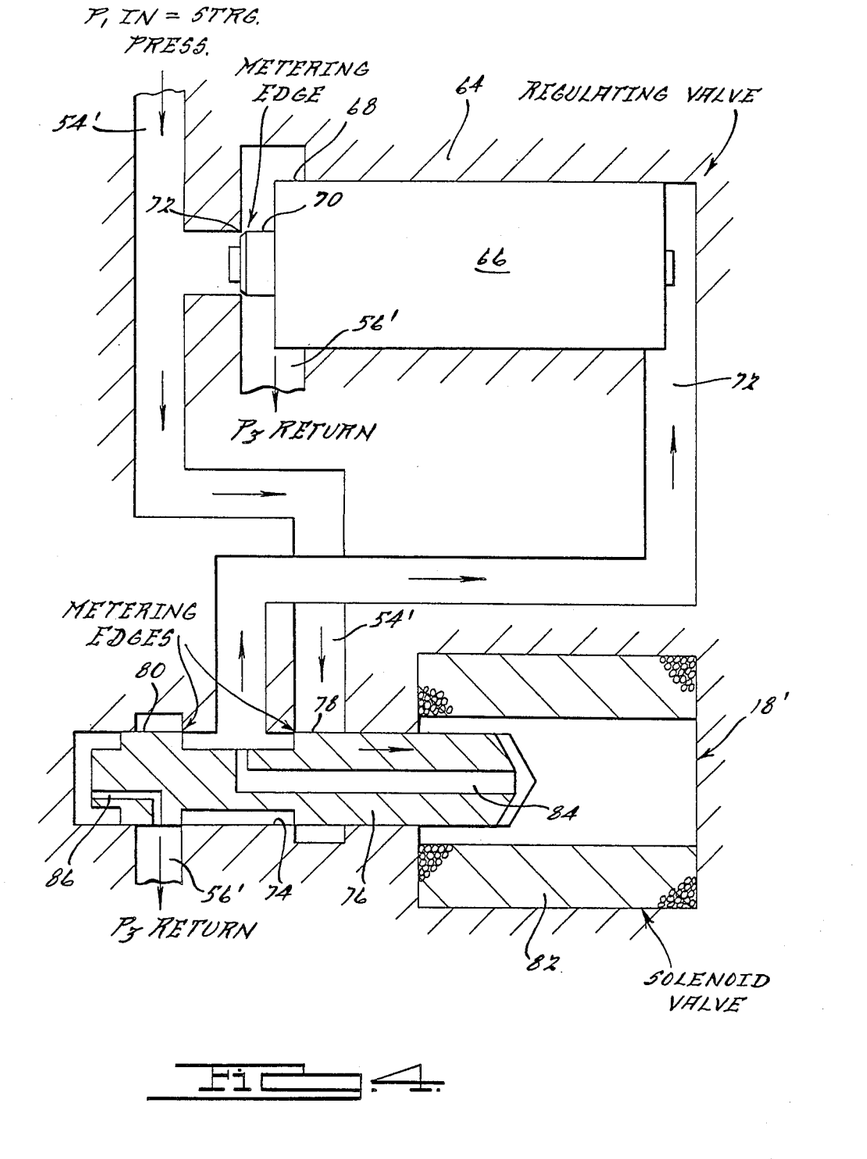
FIG. 4 is a sub-assembly view of an alternative electronic pressure control valve for use in the circuit of FIG. 1.

In FIG. 4 I have illustrated a pressure differential sensitive electronic throttling valve design. The valve sleeve 42 and the valve spool 44 of FIG. 3 have been replaced in FIG. 4 with a simplified valve sleeve 64 and a simplified valve spool 66. The latter has a first large diameter land 68 and small diameter land 70. The metering edge of land 70 can be chamfered as shown at 71.

The input passage for the electric throttling valve of FIG. 4 is shown at 54' and the return passage is shown at 56'. These passages correspond respectively to passages 54 and 56 of the FIG. 3 embodiment.

Land 70 controls the degree of communication between passage 54' and return passage 56'. The pressure in passage 56' acts on the large diameter area of land 68 and creates a pressure force acting in a right hand direction on the valve element 66 as seen in FIG. 4. That area is equal to the area of the right hand end of the valve element 66 minus the area of land 70. Valve sleeve 64 has a closed end at the right hand side of the element 66. That area is subjected to the pressure in passage 72 which communicates with a port in valve sleeve 74 of solenoid valve 18'.

Solenoid valve 18' comprises a valve spool 76 having external lands 78 and 80 that register with internal lands of the valve sleeve 74. Return passage 56', which may be common to the return passage for the regulating valve sleeve 64, register with land 80. Land 78 register with the valve port defined by the internal lands of sleeve 74 which communicate with passage 54'. Passage 72 communicates with a port in sleeve 74 at a location intermediate lands 78 and 80.

The right hand end of the spool 76 forms an armature for windings of solenoid 82. Valve element 76 is internally ported at 84 to distribute pressure in passage 72 to the right hand end of the valve element 76. Thus the pressure in passage 72 acts on the right hand end of the valve element 76.

The return pressure in passage 56' is distributed to the left hand end of the valve spool 76 through internal port 86.

The windings for solenoid 82 are supplied with current from CPU 22 as in the embodiment described with reference to FIG. 3. The bypass flow is controlled by the regulating valve spool 66, and the valve spool 76 functions merely as a pilot valve that controls the operation of the valve spool 66. Pilot valve 76 in turn responds to the force of the solenoid valve 18'. The forces required for the solenoid valve are greatly reduced by reason of the use of a pilot valve in combination with the regulator valve. This simplifies the design of the solenoid valve and reduces its cost while improving reliability of the overall system. Exact linearity in the relationship of the current in the solenoid windings with respect to the pressure differential between the supply pressure in passage 54 and the return pressure in passage 56 is not required.

Figure 5:
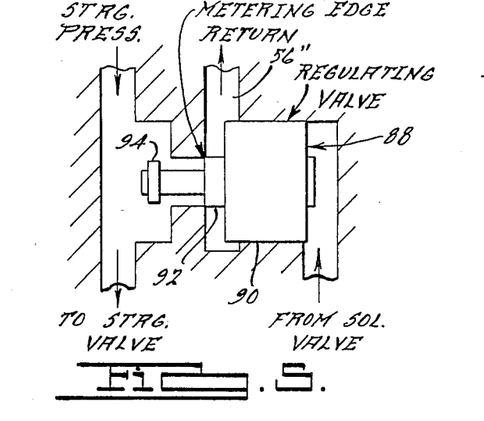
FIG. 5 is a detail view of a second alternative electronic pressure control valve in its normal regulating position.
Figure 5A:
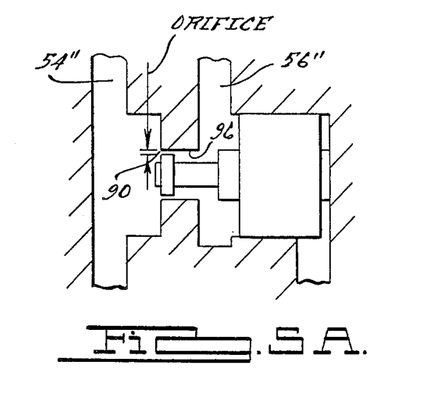
FIG. 5A is a view similar to FIG. 5 wherein the valve is in the position corresponding to an inoperative condition of the electronic pressure control valve.
Figure 5B:
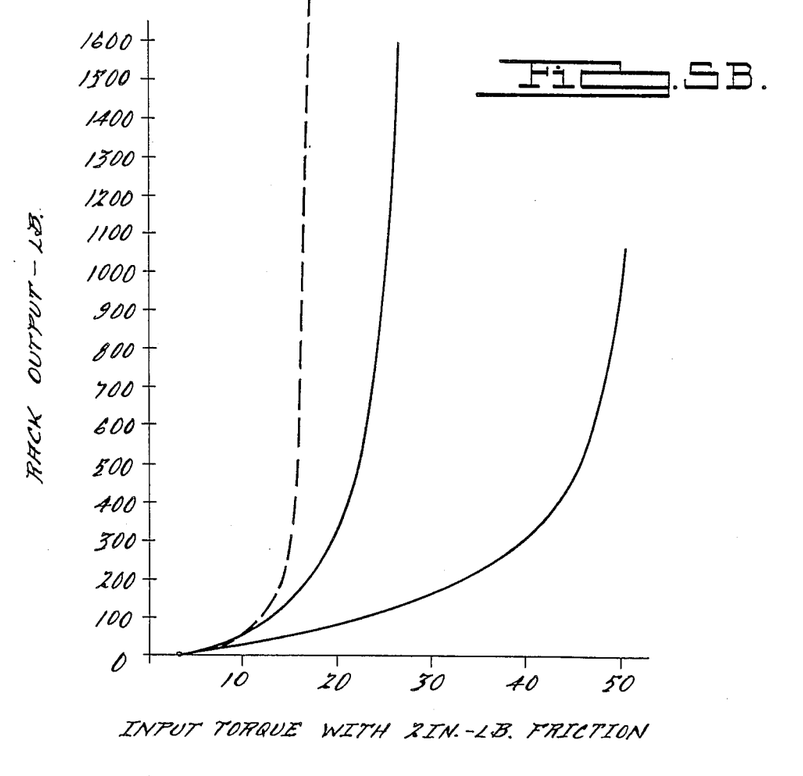
FIG. 5B is a graph for an actual working embodiment of the invention showing the relationship between steering shaft torque and steering gear output torque for a closed EPC valve and for normal operation at zero vehicle speed and for a vehicle speed of 80 MPH.

In FIGS. 5 and 5A I have illustrated an alternate regulating valve design that may be used in lieu of the valve 66 of FIG. 4. The regulating valve of FIGS. 5 and 5A includes a valve spool 88 having a large diameter land 90 and a small diameter land 92. In addition a secondary land 94 slightly less in diameter than land 92 is formed on the spool 88 at a location spaced from land 92. Pressure from the solenoid valve, as in the case of the FIG. 4 embodiment, is distributed to the right hand side of the regulating valve spool 88. The pressure in the return passage, which is identified by reference character 56" in FIGS. 5 and 5A, is equal to the difference between the area of the right hand side of the valve 88 and the area of land 92.

The valve of FIG. 5 and 5A function in a manner similar to the function of the valve 66 of FIG. 4 insofar as the lands 90 and 92 are concerned. If there is a failure in the electrical circuit for the solenoid valve or if the circuit breaker for the circuit supplying the steering system should open, the solenoid magnetic force is eliminated and pressure in passage 56' becomes equal to the pressure acting on the right hand side of the valve 88. This condition is shown in FIG. 5A. Thus the valve 88 is stroked in a right hand direction. In that condition, land 94 registers with internal land 96 of the regulating valve, the diameter of land 94 being slightly less than the diameter of land 96. Thus an orifice 98 is created which allows a fixed flow from passage 54" to passage 56" which correspond respectively to passages 54' and 56' of FIG. 4. The area of the orifice 98 is chosen so that a medium power steering pressure assist is achieved thereby eliminating an undesirable harsh transition from a power assist mode to a fully manual steering mode when the control voltage is interrupted.

Figure 6:
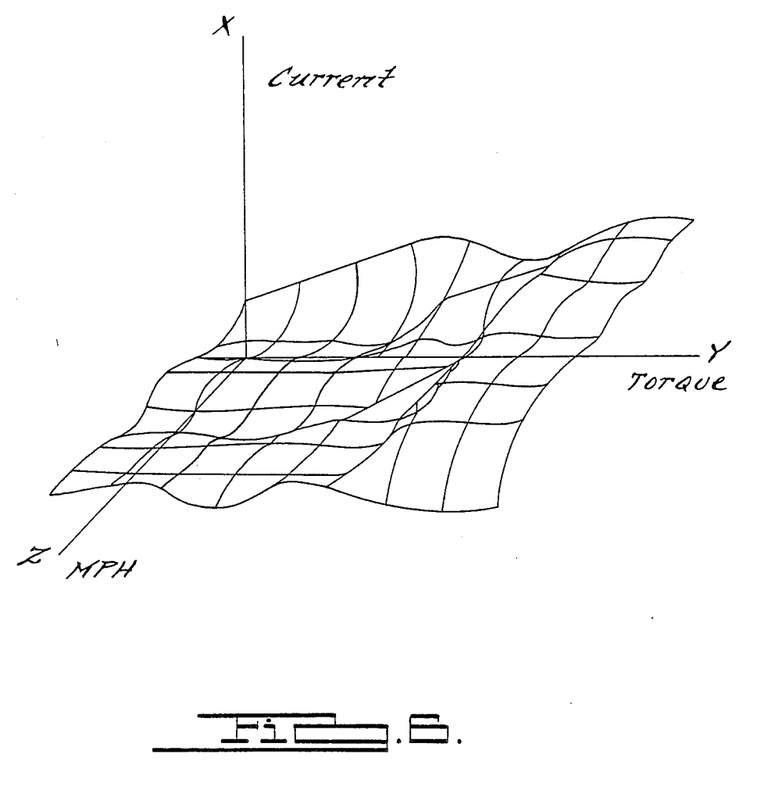
FIG. 6 is a three-dimensional representation of a control data map for a vehicle steering installation that may be programmed into the microprocessor for my improved steering system.
Figure 7:
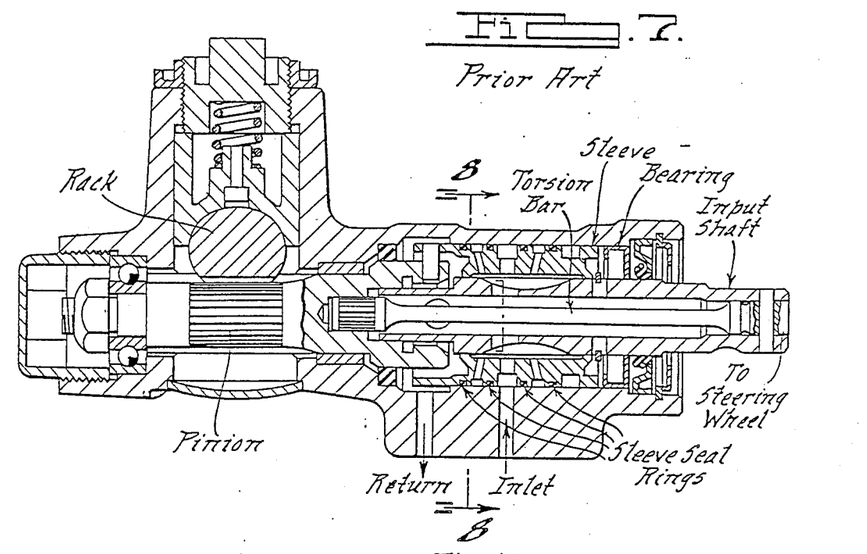
FIG. 7 is a cross-sectional schematic view of a prior art rotary-valve, rack and pinion steering gear with explanatory labels.
Figure 8:
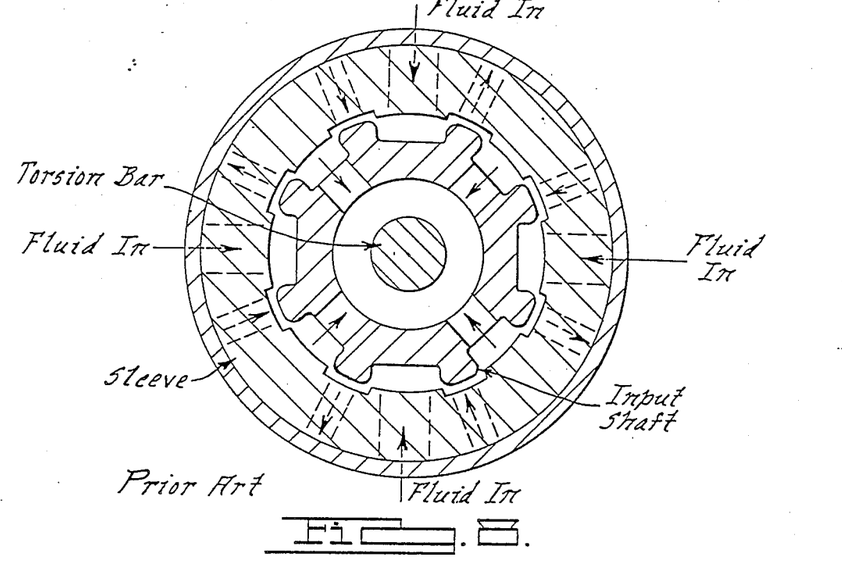
FIG. 8 is a cross-sectional view of the prior art rotary valve of FIG. 7 with explanatory labels.
Figure 9:
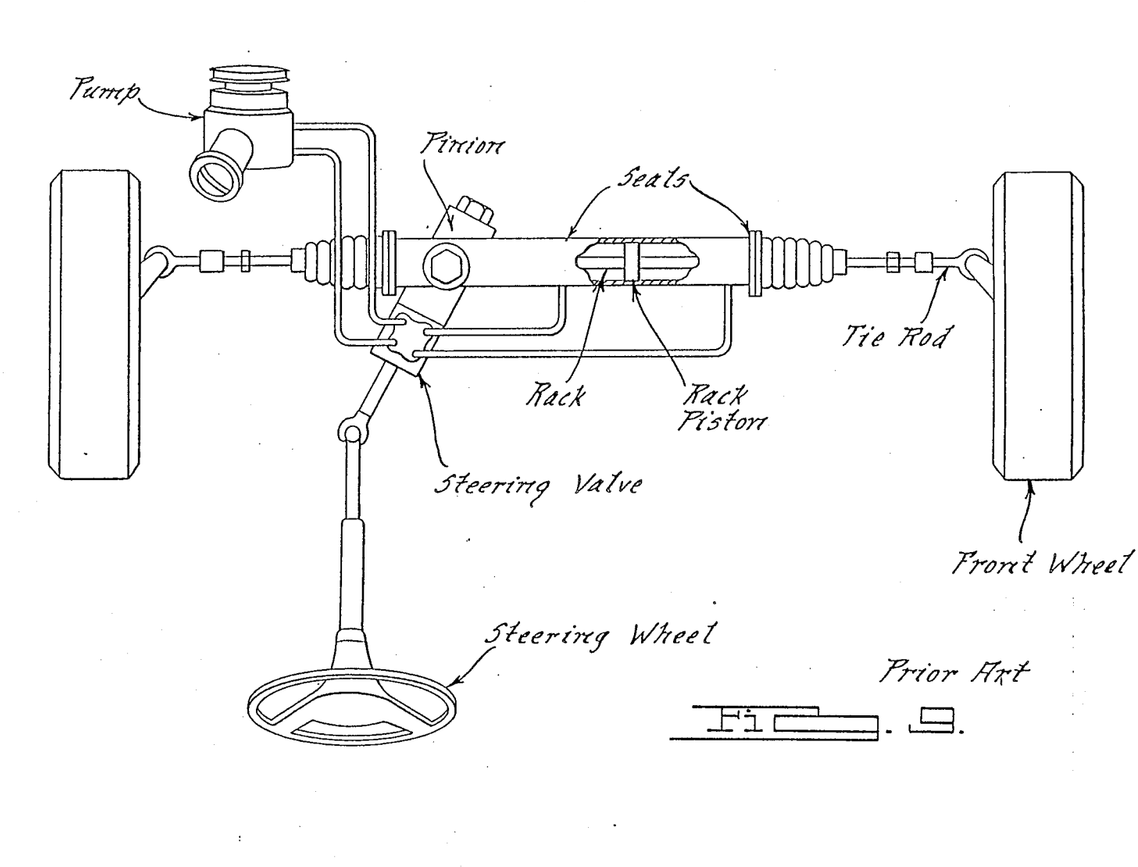
FIG. 9 is a schematic view of a prior art installation drawing in schematic form showing a steering gear fluid motor and dirigible wheel linkages together with explanatory labels.

In FIG. 6 I have shown a three dimensional plot of the relationship between the output of the central processing unit represented by electric current plotted on first axis "X", steering torque applied by operator to the torsion bar plotted on second axis "Y" and vehicle speed in miles per hour plotted on third axis "Z". FIG. 6 is a control data map which can be programmed into the memory of CPU 22. For any given relationship between torque and speed there is an optimum current distributed through electric lead 26 to the electronically controlled throttling valve 18. The data points in 56 define a surface a three dimensions as shown.

Having described a preferred embodiment of my invention, what I claim and desire to secure by U.S. Letters Patents is:

1. In a power steering system for an automotive vehicle having a tooth member adapted to be connected to a vehicle steering linkage, a driving member engageable with said gear tooth member, a driver controlled steering shaft and torsion bar connection between said steering shaft and said driving member whereby steering forces are distributed from said steering shaft to said gear tooth member;

a rotary valve assembly comprising a valve sleeve connected to and rotatable with said driving member, an inner valve element received in said valve sleeve and connected to and rotatable with said steering shaft;

a power steering pump, hydraulic pressure operated fluid motors having a pressure operated member connected to said gear tooth member whereby a fluid pressure force may be applied to said gear tooth member to supplement the manual steering effort, thereby providing the vehicle operator with a power assist;

a fluid pressure circuit connecting said pump to said fluid motor, said steering valve assembly being located in and defining in part said fluid pressure circuit whereby pressure is distributed to either one side of said fluid motor or the other depending upon the direction of torque applied to said steering shaft, said fluid pressure circuit comprising a high pressure passage connecting a high pressure side of said pump to the inlet side of said steering valve assembly and a low pressure return flow passage connecting the outlet side of said steering valve assembly with the inlet side of said pump;

an electronically controlled throttling valve located in parallel disposition in said fluid pressure circuit between the inlet side of said pump and the outlet side of said pump whereby a bypass flow path is established in parallel relationship with respect to the fluid flow path through said steering valve assembly;

an electronic central processor unit connected to said electronically controlled throttling valve, a steering torque sensor connected to said central processor unit, a steering pressure sensor in said hydraulic pressure circuit connected to said central processor unit;

a vehicle speed sensor connected to said central processor unit, said central processor unit having an electronic memory with stored vehicle speed, steering torque and steering pressure data, the relationship between said data indicating the optimum electrical voltage signal which when distributed to the electronically controlled throttle valve effects a controlled bypass of fluid from the high pressure side of said pump to the inlet side of said pump thereby effecting a controlled power assist that depends upon vehicle speed;

said electronically controlled throttling valve comprises a valve spool and a valve sleeve surrounding said valve spool, said sleeve and said spool being ported to effect controlled communication between the high pressure side of said pump and the low pressure side of said pump, and spring means for biasing said valve spool in one direction and a solenoid having windings surrounding an armature connected to said valve spool whereby displacement of said valve spool against the opposing force of said spring is dependent upon the output signal of said central processing unit, the magnitude of said output signal being determined by the magnitude of the vehicle speed sensor signal and the steering pressure sensor signal.

2. The combination as set forth in claim 1 wherein said electronically controlled throttling valve comprises a valve spool and a valve sleeve surrounding said valve spool, said sleeve and said spool being ported to effect controlled communication between the high pressure side of said pump and the low pressure side of said pump, spring means for biasing said valve spool in one direction and a variable force solenoid having windings surrounding an armature connected to said valve spool whereby displacement of said valve spool against the opposing force of said spring is dependent upon the output signal of said central processing unit, the magnitude of said output signal being determined by the magnitude of the vehicle speed sensor signal and the steering pressure sensor signal.

3. In a power steering system for an automotive vehicle having a tooth member adapted to be connected to a vehicle steering linkage, a driving member engageable with said gear tooth member, a driver controlled steering shaft and torsion bar connection between said steering shaft and said driving member whereby steering forces are distributed from said steering shaft to said gear tooth member;

a rotary valve assembly comprising a valve sleeve connected to and rotatable with said driving member, an inner valve element received in said valve sleeve and connected to and rotatable with said steering shaft;

a power steering pump, hydraulic pressure operated fluid motors having a pressure operated member connected to said gear tooth member whereby a fluid pressure force may be applied to said gear tooth member to supplement the manual steering effort, thereby providing the vehicle operator with a power assist;

a fluid pressure circuit connecting said pump to said fluid motor, said steering valve assembly being located in and defining in part said fluid pressure circuit whereby pressure is distributed to either one side of said fluid motor or the other depending upon the direction of torque applied to said steering shaft, said fluid pressure circuit comprising a high pressure passage connecting a high pressure side of said pump to the inlet side of said steering valve assembly and a low pressure return flow passage connecting the outlet side of said steering valve assembly with the inlet side of said pump;

an electronically controlled throttling valve located in parallel disposition in said fluid pressure circuit between the inlet side of said pump and the outlet side of said pump whereby a bypass flow path is established in parallel relationship with respect to the fluid flow path through said steering valve assembly;

an electronic central processor unit connected to said electronically controlled throttling valve, a steering torque sensor connected to said central processor unit;

a vehicle speed sensor connected to said central processor unit, said central processor unit having an electronic memory with stored vehicle speed, steering torque and steering pressure data, the relationship between said data indicating the optimum electrical voltage signal which when distributed to the electronically controlled throttle valve effects a controlled bypass of fluid from the high pressure side of said pump to the inlet side of said pump thereby effecting a controlled power assist that depends upon vehicle speed;

said electronically controlled throttling valve comprising a regulating valve having a regulating valve sleeve and a regulating valve spool located in said sleeve, a metering orifice having one side thereof communicating with the outlet side of said pump and the downstream side thereof communicating with the low pressure side of said pump, said regulating valve spool registering with said metering orifice and controlling its effective area as it is shifted within said regulating valve sleeve, a solenoid valve comprising a solenoid valve spool and a solenoid valve sleeve receiving said solenoid valve spool, said solenoid valve sleeve and solenoid valve spool having registering valve lands that define in part said fluid pressure circuit on the high pressure side of said pump and the fluid pressure circuit on the low pressure side of said pump, a fluid passage connecting one side of said regulating valve spool with said solenoid valve sleeve, said solenoid valve spool upon movement relative to said solenoid valve sleeve controlling the degree of communication between the high pressure side of said pump and said passage and the degree of communication between said passage and the return side of said pump, pressure distributor passages connecting said passage with one end of said solenoid valve spool and connecting the other end of said solenoid valve spool with the low pressure side of said pump, solenoid valve windings surrounding a solenoid armature connected to the solenoid valve spool whereby displacement of said solenoid valve spool relative to said solenoid valve sleeve is determined by the magnitude of the electromagnetic force developed by said solenoid windings, said solenoid windings being connected to said central processor unit, said solenoid valve spool thereby functioning as a pilot valve that triggers the operation of said regulation valve.

4. In a power steering system for an automotive vehicle having a tooth member adapted to be connected to a vehicle steering linkage, a driving member engageable with said gear tooth member, a driver controlled steering shaft and torsion bar connection between said steering shaft and said driving member whereby steering forces are distributed from said steering shaft to said gear tooth member;

- a rotary valve assembly comprising a valve sleeve connected to and rotatable with said driving member, an inner valve element received in said valve sleeve and connected to and rotatable with said steering shaft;
- a power steering pump, hydraulic pressure operated fluid motors having a pressure operated member connected to said gear tooth member whereby a fluid pressure force may be applied to said gear tooth member to supplement the manual steering effort, thereby providing the vehicle operator with a power assist;
- a fluid pressure circuit connecting said pump to said fluid motor, said steering valve assembly being located in and defining in part said fluid pressure circuit whereby pressure is distributed to either one side of said fluid motor or the other depending upon the direction of torque applied to said steering shaft, said fluid pressure circuit comprising a high pressure passage connecting a high pressure side of said pump to the inlet side of said steering valve assembly and a low pressure return flow passage connecting the outlet side of said steering valve assembly with the inlet side of said pump;
- an electronically controlled throttling valve located in parallel disposition in said fluid pressure circuit between the inlet side of said pump and the outlet side of said pump whereby a bypass flow path is established in parallel relationship with respect to the fluid flow path through said steering valve assembly;
- an electronic central processor unit connected to said electronically controlled throttling valve, a steering torque sensor connected to said central processor unit;
- a vehicle speed sensor connected to said central processor unit, said central processor unit having an electronic memory with stored vehicle speed, steering torque and steering pressure data, the relationship between said data indicating the optimum electrical voltage signal which when distributed to the electronically controlled throttle valve effects a controlled bypass of fluid from the high pressure side of said pump to the inlet side of said pump thereby effecting a controlled power assist that depends upon vehicle speed;
- said electronically controlled throttling valve comprising a regulating valve having a regulating valve sleeve and a regulating valve spool located in said sleeve, a metering orifice having one side thereof communicating with the outlet side of said pump and the downstream side thereof communicating with the low pressure side of said pump, said regulating valve spool registering with said metering orifice and controlling its effective area as it is shifted within said regulating valve sleeve, a solenoid valve comprising a solenoid valve spool and a solenoid valve sleeve receiving said solenoid valve spool, said solenoid valve sleeve and solenoid valve spool having registering valve lands that define in part said fluid pressure circuit on the high pressure side of said pump and the fluid pressure circuit on the low pressure side of said pump, a fluid passage connecting one side of said regulating valve spool with said solenoid valve sleeve, said solenoid valve spool upon movement relative to said solenoid valve sleeve controlling the degree of communication between the high pressure side of said pump and said passage and the degree of communication between said passage and the return side of said pump, pressure distributor passages connecting said passage with one end of said solenoid valve spool and connecting the other end of said solenoid valve spool with the low pressure side of said pump, solenoid valve windings surrounding a solenoid armature connected to the solenoid valve spool whereby displacement of said solenoid valve spool relative to said solenoid valve sleeve is determined by the magnitude of the electromagnetic force developed by said solenoid windings, said solenoid windings being connected to said central processor unit, said solenoid valve spool thereby functioning as a pilot valve that triggers the operation of said regulating valve;
- said regulating valve spool comprising two regulating valve lands of differential diameter, the smaller of said regulating valve lands registering with said orifice and effective to control the effective area of said orifice depending upon the differential fluid pressures acting on said regulating valve spool, an auxiliary land formed on said regulating valve spool of slightly lesser diameter than the smaller regulating valve land of said regulating valve spool, said auxiliary land moving into registry with said orifice when said regulating valve spool is shifted away from said orifice thereby establishing a flow restriction between the high pressure side of said pump and the return side of said pump whereby a moderate power assist is achieved independently of the operation of said solenoid valve.

5. In a power steering system for an automotive vehicle having a tooth member adapted to be connected to a vehicle steering linkage, a driving member engageable with said gear tooth member, a driver controlled steering shaft and torsion bar connection between said steering shaft and said driving member whereby steering forces are distributed from said steering shaft to said gear tooth member;

- a rotary valve assembly comprising a valve sleeve connected to and rotatable with said driving member, an inner valve element received in said valve sleeve and connected to and rotatable with said steering shaft;
- a power steering pump, hydraulic pressure operated fluid motors having a pressure operated member connected to said gear tooth member whereby a fluid pressure force may be applied to said gear tooth member to supplement the manual steering effort, thereby providing the vehicle operator with a power assist;
- a fluid pressure circuit connecting said pump to said fluid motor, said steering valve assembly being located in and defining in part said fluid pressure circuit whereby pressure is distributed to either one side of said fluid motor or the other depending upon the direction or torque applied to said steering shaft, said fluid pressure circuit comprising a high pressure passage connecting a high pressure side of said pump to the inlet side of said steering valve assembly and a low pressure return flow passage connecting the outlet side of said steering valve assembly with the inlet side of said pump;

an electronically controlled throttling valve located in parallel disposition in said fluid pressure circuit between the inlet side of said pump and the outlet side of said pump whereby a bypass flow path is established in parallel relationship with respect to the fluid flow path through said steering valve assembly;

an electronic central processor unit connected to said electronically controlled throttling valve, a steering torque sensor connected to said central processor unit;

a vehicle speed sensor connected to said central processor unit, said central processor unit having an electronic memory with stored vehicle speed, steering torque and steering pressure data, the relationship between said data indicating the optimum electrical voltage signal which when distributed to the electronically controlled throttle valve effects a controlled bypass of fluid from the high pressure side of said pump to the inlet side of said pump thereby effecting a controlled power assist that depends upon vehicle speed;

said electronically controlled throttling valve comprising a regulating valve having a regulating valve sleeve and a regulating valve spool located in said sleeve, a metering orifice having one side thereof communicating with the outlet side of said pump and the downstream side thereof communicating with the low pressure side of said pump, said regulating valve spool registering with said metering orifice and controlling its effective area as it is shifted within said regulating valve sleeve, a solenoid valve comprising a solenoid valve spool and a solenoid valve sleeve receiving said solenoid valve spool, said solenoid valve sleeve and solenoid valve spool having registering valve lands that define in part said fluid pressure circuit on the high pressure side of said pump and the fluid pressure circuit on the low pressure side of said pump, a fluid passage connecting one side of said regulating valve spool with said solenoid valve sleeve, said solenoid valve spool upon movement relative to said solenoid valve sleeve controlling the degree of communication between the high pressure side of said pump and said passage and the degree of communication between said passage and the return side of said pump, pressure distributor passages connecting said passage with one end of said solenoid valve spool and connecting the other end of said solenoid valve spool with the low pressure side of said pump, solenoid valve windings surrounding a solenoid armature connected to the solenoid valve spool whereby displacement of said solenoid valve spool relative to said solenoid valve sleeve is determined by the magnitude of the electromagnetic force developed by said solenoid windings, said solenoid windings being connected to said central processor unit, said solenoid valve spool thereby functioning as a pilot valve that triggers the operation of said regulating valve;

said regulating valve spool comprising two regulating valve lands of differential diameter, the smaller of said regulating valve lands registering with said orifice and effective to control the effective area of said orifice depending upon the differential fluid pressures acting on said regulating valve spool, an auxiliary land formed on said regulating valve spool of slightly lesser diameter than the smaller regulating valve land of said regulating valve spool, said auxiliary land moving into registry with said orifice when said regulating valve spool is shifted away from said orifice thereby establishing a flow restriction between the high pressure side of said pump and the return side of said pump whereby a moderate power assist is achieved independently of the operation of said solenoid valve;

said auxiliary land upon movement of said regulating valve spool away from said orifice registering with said orifice and establishing therewith an annular opening surrounding said auxiliary land that creates an effective orifice of smaller area than the effective flow area of said orifice when the smaller flow metering land of said regulating valve spool moves away from said orifice.

* * * * *